United States Patent
Lesartre et al.

(10) Patent No.: US 10,452,498 B2
(45) Date of Patent: Oct. 22, 2019

(54) FAULT TOLERANCE FOR PERSISTENT MAIN MEMORY

(71) Applicant: HEWLETT PACKARD ENTERPRISE DEVELOPMENT LP, Houston, TX (US)

(72) Inventors: Gregg B. Lesartre, Fort Collins, CO (US); Dale C. Morris, Steamboat Springs, CO (US); Gary Gostin, Plano, TX (US); Russ W. Herrell, Fort Collins, CO (US); Andrew R. Wheeler, Fort Collins, CO (US); Blaine D. Gaither, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/901,559

(22) PCT Filed: Jun. 28, 2013

(86) PCT No.: PCT/US2013/048759
§ 371 (c)(1),
(2) Date: Dec. 28, 2015

(87) PCT Pub. No.: WO2014/209394
PCT Pub. Date: Dec. 31, 2014

(65) Prior Publication Data
US 2016/0147620 A1    May 26, 2016

(51) Int. Cl.
*G06F 11/00* (2006.01)
*G06F 11/16* (2006.01)
(Continued)

(52) U.S. Cl.
CPC ...... *G06F 11/1666* (2013.01); *G06F 11/1004* (2013.01); *G06F 11/108* (2013.01);
(Continued)

(58) Field of Classification Search
CPC .................................................. G06F 11/0748
(Continued)

(56) References Cited

U.S. PATENT DOCUMENTS

| 5,546,558 A | 8/1996 | Jacobson et al. |
| 2002/0065998 A1 | 5/2002 | Buckland |

(Continued)

FOREIGN PATENT DOCUMENTS

| CN | 1728099 C | 2/2006 |
| CN | 101663646 A | 3/2010 |
| CN | 102483710 A | 5/2012 |

OTHER PUBLICATIONS

International Searching Authority, The International Search Report and the Written Opinion, dated Mar. 31, 2014, for PCT/US2013/04875931, filed Jun. 28, 2013, 10 Pages.

(Continued)

*Primary Examiner* — Sarai E Butler
(74) *Attorney, Agent, or Firm* — Michael A. Dryja

(57) ABSTRACT

A computing system can include a processor and a persistent main memory including a fault tolerance capability. The computing system can also include a memory controller to store data in the persistent main memory and create redundant data. The memory controller can also store the redundant data remotely with respect to the persistent main memory. The memory controller can further access the redundant data during failure of the persistent main memory.

20 Claims, 4 Drawing Sheets

(51) Int. Cl.
    *G06F 11/10* (2006.01)
    *G06F 11/20* (2006.01)
(52) U.S. Cl.
    CPC .......... *G06F 11/2069* (2013.01); *G06F 11/20* (2013.01); *G06F 2201/805* (2013.01)
(58) Field of Classification Search
    USPC .................................................. 714/6.3, 6.31
    See application file for complete search history.

(56) References Cited

U.S. PATENT DOCUMENTS

| | | |
|---|---|---|
| 2002/0194530 A1 | 12/2002 | Santeler et al. |
| 2003/0070043 A1 | 4/2003 | Merkey |
| 2004/0111443 A1* | 6/2004 | Wong .................. G06F 11/1435 |
| 2004/0260977 A1 | 12/2004 | Ji et al. |
| 2004/0268177 A1* | 12/2004 | Ji ........................ G06F 11/2071 |
| | | 714/5.11 |
| 2006/0026451 A1 | 2/2006 | Voigt |
| 2011/0307665 A1* | 12/2011 | Rudelic ................. G06F 12/084 |
| | | 711/130 |
| 2012/0011340 A1 | 1/2012 | Flynn et al. |
| 2012/0079318 A1 | 3/2012 | Colgrove et al. |
| 2012/0084496 A1* | 4/2012 | Rudelic ............... G06F 11/1032 |
| | | 711/104 |
| 2012/0185727 A1 | 7/2012 | Yoon et al. |
| 2012/0239860 A1 | 9/2012 | Atkisson et al. |
| 2013/0018928 A1 | 1/2013 | Lacapra et al. |
| 2013/0103978 A1 | 4/2013 | Akutsu |
| 2014/0195634 A1* | 7/2014 | Kishore .............. H04L 67/1097 |
| | | 709/213 |
| 2015/0288752 A1 | 10/2015 | Voigt |

OTHER PUBLICATIONS

Kevin Lim et al., "System-levei Impiicatons of Disaggregated Memory," (Research Paper), 18th International Symposium on High Performance Computer Architecture, 2012,, 12 pages.
Extended European Search Report received in EP Application No. 13887761.8, Feb. 7, 2017, 13 pages.

* cited by examiner

FAULT TOLERANCE FOR PERSISTENT MAIN MEMORY

CROSS-REFERENCE TO RELATED APPLICATION

This application is a United States National Stage Application of International Patent Application No. PCT/US2013/048759, filed on Jun. 23, 2013, the contents of which are incorporated by reference as if set forth in their entirety herein.

BACKGROUND

Current data storage devices often include a fault tolerance to ensure that data is not lost in the event of a device error or failure. An example of a fault tolerance provided to current data storage devices is a redundant array of independent disks. A redundant array of independent disks (RAID) is a storage technology that controls multiple disk drives and provides fault tolerance by storing data with redundancy. RAID technology can store data with redundancy in a variety of ways. Examples of redundant data storage methods include duplicating data and storing the data in multiple locations and adding bits to store calculated error recovery bits.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
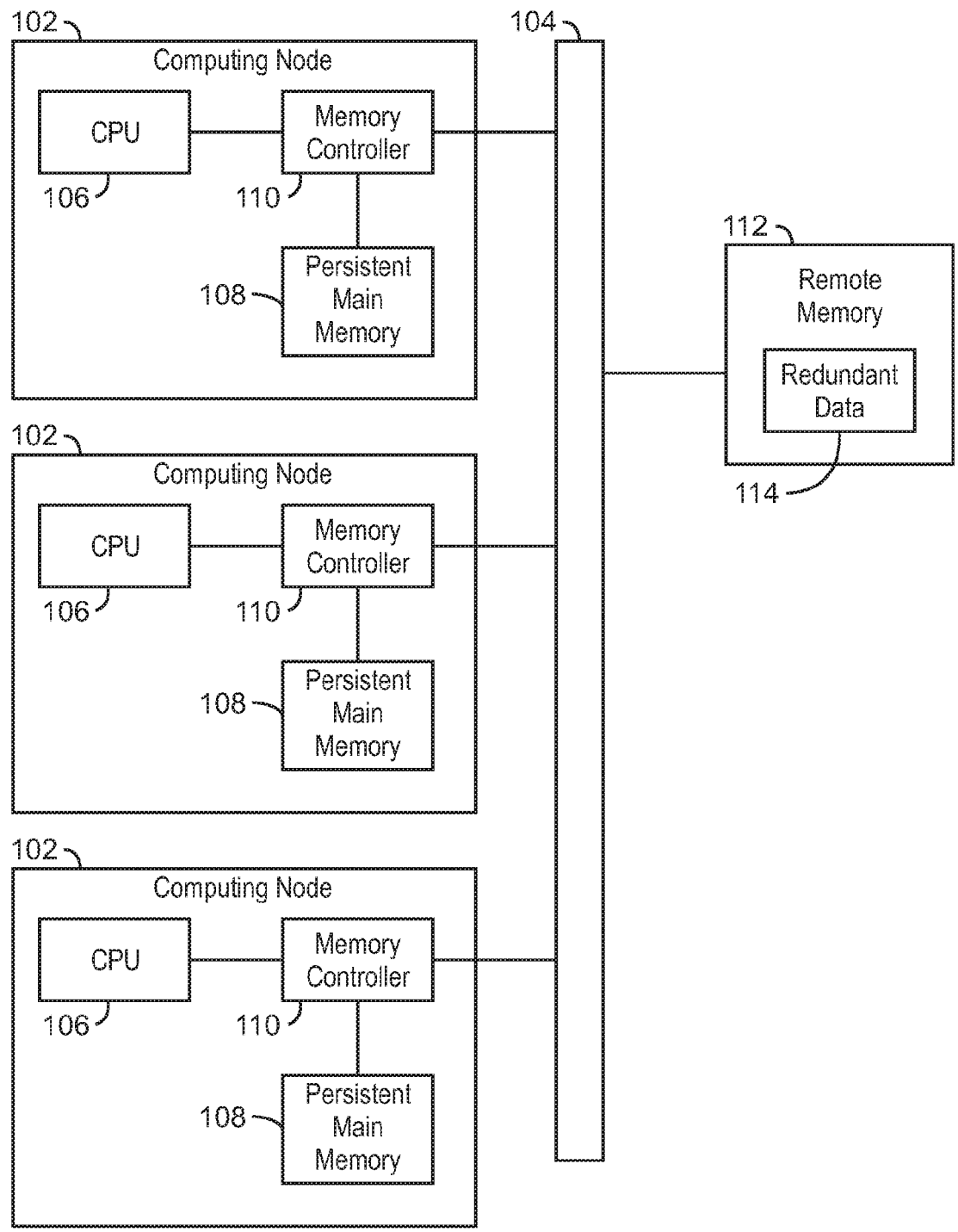
FIG. 1 is a block diagram of an example of a computing system including fault tolerance.

Techniques described herein relate generally to redundant data storage. More specifically, techniques described herein relate to redundant data storage in persistent main memory. Main memory is primary storage that is directly or indirectly connected to a central processing unit (CPU) and is directly accessible to the CPU. For redundancy of data stored to a disk, current systems provide a storage array controller that intercepts a block store and its associated data and stores the data redundantly across a number of disk devices to ensure that the data can be recovered in the event of a failure of one or more devices. One approach is to calculate and store error recovery bits, such as RAID 5 parity, such that any data lost in a failing device can be recreated from the error recovery bits and data from the non-failing devices. Another approach is to duplicate the data and store the data in multiple locations, such as via RAID 1 technology. A variety of RAID levels and algorithms can be used to provide the desired level of protection. Other systems have attached multiple channels of disk storage to a system. Duplication or RAIDing of the data is then handled within the storage management software for the system. When blocks of data are to be committed to storage, software initiates multiple transfers to multiple disks in order to implement the desired RAID algorithms.

These current systems for providing redundancy to data stored to a disk work for block storage devices when blocks transferred to a disk are managed by paging software and IO DMA mechanics. However, these methods are not well suited to directly accessed storage, such as persistent main memory, which gains performance benefit not only from its short access latency, but also from the absence of block-transfer IO handlers. Directly accessed storage also gains performance benefit from the efficiencies of moving only data that is actually modified or requested, rather than the entire block.

When storage is written with relied-upon data, whether it is in traditional devices such as spinning hard disks, solid state disks, or in the direct access model, data integrity is preferably preserved. With slower disk devices, this data integrity is managed when blocks of data are transferred between non-persistent memory and disk. When blocks of data are transferred, software, or attached storage arrays, provide for the scattering of the data across multiple devices. In this model, a failure of one such device will cause the loss of a portion of the stored bits, but the complete data is recoverable from the remaining devices.

New system architectures take advantage of dense, persistent, low latency memory devices to provide for large storage arrays accessed directly by a processor and cached in a processor's caches. New solid state persistent memory devices with densities like flash memory and access times like DRAM memories allow the design of systems that treat this memory as storage, but access it as memory, i.e., through direct memory access, allowing the solid state persistent memory devices to be used as persistent main memory. To protect data stored in this persistent main memory, capabilities are integrated into the paths to access this memory which, in addition to routing write requests to memory, also route the data in a mirrored or RAID fashion to multiple storage locations in separate persistent memory devices. This routing ensures data recovery in the case of a persistent memory device failure while maintaining current programming paradigms.

By adding fault tolerance functionality in the main memory access path that operates on small units of data, for example individual cache lines, at main memory access speeds, this type of data protection (e.g., data duplication or RAIDing) can be extended to direct memory access, such as persistent main memory, without awareness of the protection mechanism at a software application level. Current redundancy solutions only move data to disk when software is ready to commit that data. The system must then wait for this operation to complete, including the time required to write full RAID data to multiple devices before proceeding. In the present invention, storage commit can be completed faster by performing the RAID updates to persistent main memory as the individual cache line writes occur. Further, by spreading cache lines of a memory page across multiple persistent main memories, RAID operations for multiple cache lines can be processed in parallel. By processing the RAID operations in parallel, the time to complete transactions is reduced and demand on the system is balanced. The overall result is a faster, more efficient distribution of protected data across storage devices, from a power and data-movement perspective.

FIG. 1 is a block diagram of a computing system 100 including fault tolerance. In an example, computing system 100 is a server cluster. The computing system 100 includes a number of nodes, such as computing nodes 102. In a further example, computing system 100 may also include a memory node, such as remote memory node 112, or multiple memory nodes. A memory node is a collection of memory, such as a collection of memory devices, for storing a large amount of data. The nodes 102 are communicably coupled to each other through a network 104, such as a server cluster fabric. The computing system 100 can include several compute nodes, such as several tens or even thousands of compute nodes.

The compute nodes 102 include a Central Processing Unit (CPU) 106 to execute stored instructions. The CPU 106 can be a single core processor, a multi-core processor, or any other suitable processor. In an example, compute node 102 includes a single CPU. In another example, compute node 102 includes multiple CPUs, such as two CPUs, three CPUs, or more.

The compute node 102 includes a persistent main memory 108. The persistent main memory 108 can include volatile dynamic random access memory (DRAM) with battery backup, non-volatile phase change random access memory (PCRAM), spin transfer torque-magnetoresistive random access memory (STT-MRAM), resistive random access memory (reRAM), memristor, FLASH, or other types of memory devices. For example, the persistent main memory 108 can be solid state, persistent, dense, fast memory. Fast memory can be memory having an access time similar to DRAM memory.

Compute node 102 further includes a memory controller 110. The memory controller 110 communicates with the persistent main memory 108 and controls access to the persistent main memory 108 by the CPU 106. Persistent memory is non-volatile storage, such as storage on a storage device. In an example, the memory controller 110 can be a RAID memory controller. When the memory controller 110 receives an access request for persistent main memory 108, the memory controller 110 generates transactions to the local persistent main memory 108.

Computing system 100 also includes remote memory 112. Remote memory 112 can be persistent memory, and may be identical to persistent main memory 108. Remote memory 112 is communicably coupled to the computing nodes through a network 104, such as a server cluster fabric. Remote memory is remote and separate from persistent main memory 108. For example, remote memory 112 can be physically separate from persistent main memory 108. In an example, remote memory can be persistent memory divided into regions or ranges of memory address spaces. Each region can be assigned to a computing node 102. Each region can additionally be accessed by computing nodes other than the assigned computing node. In the event of a failure of the assigned computing node, another computing node can access the region or the region can be reassigned in order to preserve access to the data in remote memory.

Remote memory 112 includes redundant data 114. Remote memory 112 acts as a fault tolerance capability (i.e., providing a system and/or method of data recovery in order to ensure data integrity) to persistent main memory 108 via redundant data 114. When a memory controller 110 receives a write operation to persistent main memory configured for redundant storage to ensure the integrity of the data, the memory controller 110 will generate a transaction to the remote memory 112, resulting in generation and storage of redundant data 114, at the same time as the memory controller 110 writes to the persistent main memory 108. By storing redundant data 114 to the remote memory 112, the data is effectively spread across multiple devices such that the data can be recovered when a device, or even multiple devices, fails.

In an embodiment employing RAID 1, the write data is duplicated, or mirrored, to produce an identical copy of the data. In this mirroring mode, the data is written to local persistent main memory 108. An identical copy of the data is written to remote memory 112, becoming redundant data 114. In mirroring mode, memory controller 110 accesses persistent main memory 108 in response to requests by CPU 106. In mirroring mode, remote memory 112 is large enough to store copies of all data stored in persistent main memory 108 of all computing nodes 102 in computing system 100. In the example illustrated by FIG. 1, remote memory 112 is at least three times larger than persistent main memory 108, in order to have the capacity to store copies of all data stored in persistent main memory 108.

However, if the persistent main memory 108 of a computing node 102 becomes inaccessible, such as because of a failure of persistent main memory 108, the redundant data 114 is accessed. Standard error-detection or error-correction codes, such as parity or error-correcting codes (ECC), can be used to detect when a locally uncorrectable error, i.e., an error in persistent main memory 108 that cannot be corrected with only the error correction code (ECC) of the persistent main memory 108, has occurred in the data read from persistent main memory 108. The error-detection/correction codes signal memory controller 110 to read the redundant data 114 from the remote memory 112. The redundant data 114 from the remote memory 112 is provided to CPU 106 to satisfy the access request, and copied to persistent main memory 108, when persistent main memory 108 is functional, or used to create an alternate redundant copy of the data in a new location when persistent main memory 108 is no longer functional. The redundant data 114 can also be accessed, such as by another computing node 102, in the event of a failure of the local computing node 102. In that event, the new computing node 102 will be able to access the redundant data 114 and continue where the failed node 102 left off. In addition, in the event that the copy of the data stored to persistent main memory 108 becomes corrupted, the redundant data 114 can be accessed and a copy of the original data saved to persistent main memory 108. In another example, another computing node 102 can access a copy of the data from remote memory 112, without involving the originating computing node 102.

Persistent main memory 108 is generally accessed, such as in a read transaction, in order to service requests at the lowest latency. As a result, remote memory 112 is rarely accessed. An implementation may choose to occasionally access remote memory 112 to confirm that remote memory 112 remains accessible and able to provide correct data. By confirming the accessibility of remote memory 112, the integrity of the redundant data 114 is ensured. In an example, memory accesses, such as read requests, can occasionally be serviced by accessing the redundant data 114 of remote memory 112 rather than persistent main memory 108. By occasionally servicing a memory access from remote memory 112, the system 100 can verify that remote memory 112 and redundant data 114 have not failed.

Memory controllers 110 often scrub stored data in order to detect and correct any soft errors that may have occurred during a period of infrequent access. In an example, scrubbing of redundant data 114 in remote memory 112 is supported by memory controller 110. In another example, remote memory 112 provides scrubbing of redundant data 114 without involving memory controller 110.

In another embodiment, RAID 4 across computing nodes 102 is employed to ensure data integrity. Remote memory 112 is used to hold RAID parity controlled by memory controller 110. In this RAID mode, memory controller 110 is a RAID controller. The memory controller 110 can include a data recovery engine configured to rebuild data after an access failure renders the data inaccessible. The data recovery engine includes a combination of hardware and programming. For example, the data recovery engine can include a non-transitory, computer-readable medium for storing instructions, one or more processors for executing the instructions, or a combination thereof.

Upon receiving a request to write data to memory, memory controller 110 writes the new data to persistent main memory 108. In addition, the memory controller 110 sends a command to update the redundant data 114 on remote memory 112. For example, the memory controller 110 performs an exclusive or (XOR) operation on the incoming write data with the old data in persistent main memory 108. The memory controller 110 then sends a write delta (write changes) command with the results of the XOR operation to remote memory 112. Remote memory 112 will read the redundant data 114, which consists of RAID 4 parity, XOR it with the write delta data, and write the result back into redundant data 114. In an example, the redundant data 114 is updated at the same time that the data is written to persistent main memory 108. When all memory writes have been completed by persistent main memory 108 and remote memory 112, memory controller 110 sends a response to the system write transaction to CPU 106 indicating that the write has been completed and made durable. In an example, computing system 100 includes a single remote memory 112. In another example, computing system 100 includes multiple remote memories 112.

When memory controller 110 in a system employing a RAID 4 level receives a request to read data, the memory controller attempts to read the data from local persistent main memory 108. If the data in persistent main memory 108 has a locally-uncorrectable error, or the local persistent main memory is inaccessible, the memory controller 110 will read the RAID 4 parity from redundant data 114, read data associated with the RAID 4 parity from persistent main memories 108 of all other computing nodes 102, and then XOR the RAID 4 parity with all associated data to regenerate the uncorrectable local data. The regenerated data is returned to CPU 106. If the local persistent main memory 108 is available, the regenerated data is saved to persistent main memory 108. If the persistent main memory 108 is not available, the regenerated data can be saved to the persistent main memory of another computing node. In a further example, the regenerated data can be saved to remote memory 112. The regenerated data can then be accessed by the original computing node with non-available persistent main memory 108, or by a replacement computing node.

In the event of a failure of the computing node 102, a replacement computing node 102 accesses the redundant data 114 on remote memory 112, and copies the data to the local persistent main memory 108 of the replacement computing node.

In a further example employing RAID 1, a second computing node acts as remote memory containing redundant data for the first computing node 102. The second computing node includes a memory controller coupled to persistent main memory. The memory controller 110 on the first computing node 102 receives a request from CPU 106 to write data to local persistent main memory 108. The memory controller writes the new data, or updates stored data, to the persistent main memory 108 of the first computing node 102. At the same time, the redundant data is sent to the memory controller 110 on the second computing node.

The memory controller on the second computing node writes the redundant data into local persistent main memory 108, and then sends a response to the memory controller on the first computing node. When all memory writes have been completed by persistent main memory 108 on the first computing node and persistent main memory 108 on the second computing node, memory controller 110 on the first computing node sends a response to the system write transaction to CPU 106 on the first computing node. In an example, multiple additional computing nodes can act as remote memories containing redundant data for the first computing node 102. In a further example, the redundant data for the first computing node 102 can be distributed across multiple computing nodes.

When memory controller 110 in a system employing a RAID 1 level receives a request to read data, the memory controller reads the data from local persistent main memory 108. If the data in persistent main memory 108 has a locally-uncorrectable error, or the local persistent main memory is inaccessible, the memory controller 110 accesses the redundant data in the persistent main memory 108 of the second computing node 102. In the event of such a failure, the memory controller 110 can identify the memory location of the inaccessible data. A memory location can be in a memory address space. In some embodiments, a table of memory address spaces can be built to expedite the identification of memory locations corresponding to inaccessible data. The table of memory address spaces can be built by the memory controller 110.

It is to be understood the block diagram of FIG. 1 is not intended to indicate that computing system 100 is to include all of the components shown in FIG. 1 in every case. Further, any number of additional components may be included within computing system 100, depending on the details of the specific implementation.

Figure 2:
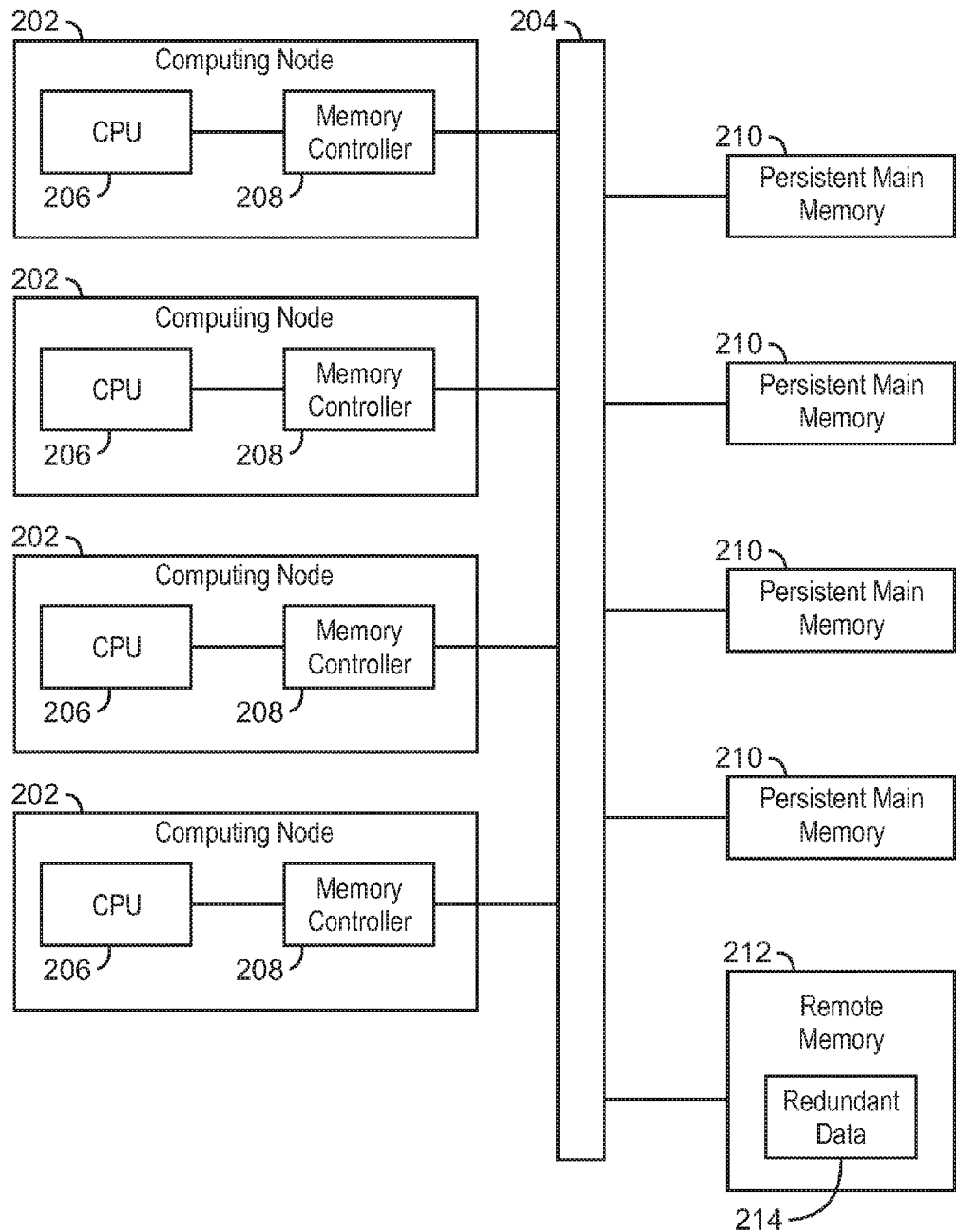
FIG. 2 is a block diagram of an example of a computing system including fault tolerance.

FIG. 2 is a block diagram of a computing system 200 including fault tolerance. In an example, computing system 200 is a server cluster. The computing system 200 includes a number of nodes, such as computing node 202. In a further example, computing system 200 may also include a number of memories, such as persistent main memory 210. A persistent main memory 210 is a collection of memory, such as a collection of memory devices, for storing a large amount of data. The computing nodes 202 and persistent main memories 210 are communicably coupled to each other through a network 204. The computing system 200 can include several compute nodes, such as several tens or even thousands of compute nodes, and several persistent main memories.

The compute nodes 202 include a Central Processing Unit (CPU) 206 to execute stored instructions. The CPU 206 can be a single core processor, a multi-core processor, or any other suitable processor. In an example, a compute node 202 includes a single CPU. In another example, a compute node 202 includes multiple CPUs, such as two CPUs, three CPUs, or more.

Compute node 202 further includes a memory controller 208. The memory controller 208 communicates with persistent main memories 210 and controls access to persistent main memories 210, by the CPU 206. In an example, the memory controller 208 is a RAID memory controller. When the memory controller 208 receives a request to write to persistent main memory 210, the memory controller 208 generates a write transaction to the selected persistent main memory 210.

Each compute node 202 can be communicably coupled with the persistent main memories 210. The persistent main memory 210 can be volatile dynamic random access memory (DRAM) with battery backup, non-volatile phase change random access memory (PCRAM), spin transfer torque-magnetoresistive random access memory (STT-MRAM), resistive random access memory (reRAM), memristor, FLASH, or other types of memory devices. In an example, the persistent main memory 210 is solid state, persistent, dense, fast memory. Fast memory can be memory having an access time similar to DRAM memory. Persistent main memory 210 is remote to computing nodes 202 and is accessed via a network 204, such as a communication fabric.

The persistent main memories 210 can be combined to form a pool of non-volatile, persistent main memory. Regions of the pool of non-volatile, persistent main memory are allocated to computing nodes 202 within computing system 200. In the event of a failure of a particular computing node 202, the region of the pool of non-volatile, persistent main memory allocated to the failed computing node may be reallocated to a functioning computing node 202. In this way, access to the data in the non-volatile memory region is not lost when the computing node fails. In a further example, regions of the pool of non-volatile, persistent main memory can be accessed by additional computing nodes 202.

In a further example, the computing system 200 includes a single persistent memory. The persistent memory is divided into regions (ranges of memory address spaces). Each region is assigned to a computing node to act as persistent main memory 210 for the computing node 102. Each region can also be accessed by additional computing nodes. In the event of a failure of the assigned computing node, the region of memory can be reassigned to a functioning computing node.

Computing system 200 also includes remote memory 212. Remote memory is a persistent main memory, such as persistent main memory 210, which has been designated by the system 200 to act as remote memory 212. In an example, multiple persistent main memories can be designated to act as remote memories 212. Remote memory 212 is communicably coupled to the computing nodes through a network 204, such as a communication fabric.

Remote memory 212 includes redundant data 214. Remote memory 212 provides a fault tolerance capability (i.e., providing a system and/or method of data recovery in order to ensure data integrity) to persistent main memory(s) 210 via redundant data 214. The redundant data stored by the remote memory(s) 212 can be accessed by the computing nodes 102. The redundant data stored by the remote memory(s) 212 can also be accessed by additional computing nodes, such as in the event of a failure of a computing node or data corruption.

In an embodiment, persistent main memories 210 and remote memory 212 are organized as a RAID 1 group. Remote memory 212 is used to hold data controlled by memory controllers 208. In this embodiment, memory controller 208 is a RAID controller. Each memory controller 208 independently performs all RAID calculations for the region of the pool of non-volatile, persistent main memory allocated to the particular memory controller 208. The memory controller 208 can include a data recovery engine configured to rebuild data after an access failure renders the data inaccessible. The data recovery engine includes a combination of hardware and programming. For example, the data recovery engine can include a non-transitory, computer-readable medium for storing instructions, one or more processors for executing the instructions, or a combination thereof.

Upon receiving a system write transaction from CPU 206, memory controller 208 writes the new data to the selected persistent main memory 210. In addition, the memory controller 208 sends a command to update the redundant data 214 stored in remote memory 212. In an example, the redundant data 214 is written with a copy of the new data at the same time that the new data is written to persistent main memory 210. When all memory writes have been acknowledged by persistent main memory 210 and remote memory 212, memory controller 208 sends a response to the system write transaction to CPU 206 indicating that the write has been completed and made durable. In an example, computing system 200 includes a single remote memory 212. In another example, computing system 200 includes multiple remote memories 212.

When a memory controller 208 in computing node 202 of a system 200 employing a RAID protocol receives a request from CPU 206 to read data, the memory controller 208 reads the data from the selected persistent main memory 210. If the data in the persistent main memory 210 has a locally-uncorrectable error, or the persistent main memory is inaccessible, the memory controller 208 accesses remote memory 212 to read the redundant data 214. In the event of such a failure, the memory controller 208 can identify the memory location of the inaccessible data. A memory location can be a memory address space. In some embodiments, a table of memory address spaces can be built to expedite the identification of memory locations corresponding to inaccessible data. The table of memory address spaces can be built by the memory controller 208.

The memory controller 208 regenerates the data, such as with the data recovery engine, from redundant data 214 and sends the regenerated data to CPU 206, completing the read request. If the selected persistent main memory 210 is available, the regenerated data is also saved to the selected persistent main memory 210. If the selected persistent main memory 210 is not available, the regenerated data can be saved to an additional persistent main memory. The regenerated data can then be accessed by the computing nodes 202.

In another embodiment, RAID 5 across persistent main memories 210 is employed to ensure data integrity. For RAID 5, parity is distributed across all persistent main memories 210, rather than placed solely in remote memory 212, in order to maximize available memory bandwidth. In this RAID mode, memory controller 208 is a RAID controller. The RAID controller can include a data recovery engine configured to regenerate data after a hardware failure renders the data inaccessible.

Upon receiving a request from CPU 206 to write data to memory, memory controller 208 reads the old data from persistent main memory 210 selected by the write address, and performs an exclusive or (XOR) operation using the old data and the new write data. The memory controller 208 then writes the new data to the persistent memory 210 selected by the write address. Additionally, the memory controller 208 then sends a write delta (write changes) command with the results of the XOR operation to a second persistent main memory 210. The second persistent main memory is selected based on the write address, and contains the RAID 5 parity data for the specified write address. The second persistent main memory 210 will read the RAID 5 parity data, XOR it with the write delta data, and write the result back into the RAID 5 parity data. In an example, the RAID 5 parity data is updated at the same time that the data is written to persistent main memory 210. When all memory writes have been completed by persistent main memory 210 and parity persistent main memory 210, memory controller 208 sends a response to the system write transaction to CPU 206 indicating that the write has been completed and made durable. In an example, computing system 200 includes multiple persistent main memories 210, so as to reduce the memory capacity overhead of RAID 5.

When memory controller 208 in a system employing RAID 5 receives a request from CPU 206 to read data, the memory controller attempts to read the data from a first persistent main memory 210 selected by the read address. If the data in the first persistent main memory 210 has a locally-uncorrectable error, or the persistent main memory is inaccessible, the memory controller 208 will read the RAID 5 parity associated with the uncorrectable data, and read all other data associated with the RAID 5 parity from other persistent main memories 210. The memory controller 208 will then compute the XOR of the RAID 5 parity with all associated data to regenerate the uncorrectable local data. The regenerated data is returned to CPU 206. If the first persistent main memory 210 is available, the regenerated data is saved to first persistent main memory 210. If the first persistent main memory 210 is not available, the regenerated data can be saved to an alternate persistent main memory. The regenerated data can then be accessed from the alternate persistent main memory by any of the computing nodes 202.

The computing system 200 can be adapted to employ other standard RAID levels, i.e., RAID level 2, 3, 4, or 6. Depending on the RAID level employed, remote memory 212 may or may not be used.

It is to be understood the block diagram of FIG. 2 is not intended to indicate that computing system 200 is to include all of the components shown in FIG. 2 in every case. Further, any number of additional components may be included within computing system 200, depending on the details of the specific implementation.

Figure 3:
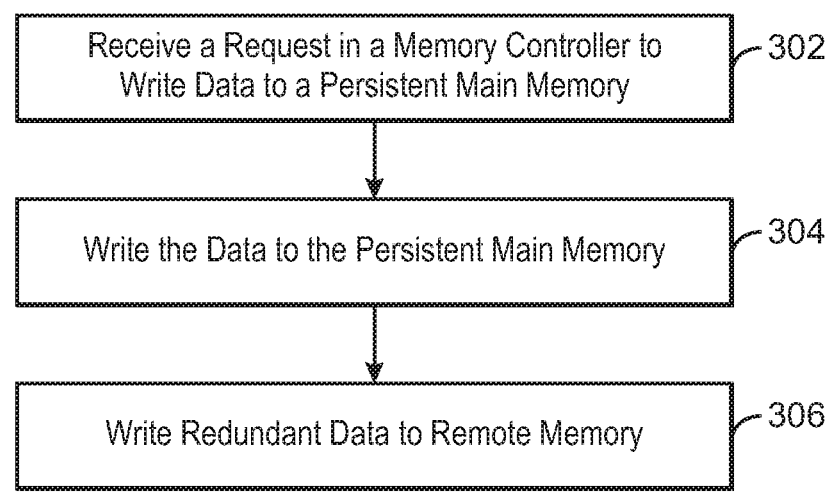
FIG. 3 is a process flow diagram of an example of a method of writing data to memory with fault tolerance.

FIG. 3 is a process flow diagram of a method 300 of writing data to memory with fault tolerance. At block 302, a request is received in a memory controller to write data to a non-volatile, persistent main memory. The memory address space is an address space of non-volatile, persistent main memory, such as persistent main memory 108 or 210, of a computing system. In an example, the memory controller resides in a computing node, such as computing node 102 or 202. The request originates from a processor, such as CPU 106 or 206.

At block 304, the data is written to the persistent main memory. In an example, the persistent main memory resides in a computing node. In another example, the persistent main memory is remote from a computing node and forms a pool of persistent main memory, and the data is written to a region of the pool of non-volatile, persistent main memory allocated to the computing node.

At block 306, redundant data is written to remote memory. In an example, the redundant data is a mirrored copy of the data. In another example, the redundant data is written with the result of calculating an XOR of the new write data, the old data and the old RAID parity. In a further example, blocks 304 and 306 occur simultaneously.

It is to be understood that the process flow diagram of FIG. 3 is not intended to indicate that the steps of the method 300 are to be executed in any particular order, or that all of the steps of the method 300 are to be included in every case. Further, any number of additional steps not shown in FIG. 3 may be included within the method 300, depending on the details of the specific implementation.

Figure 4:
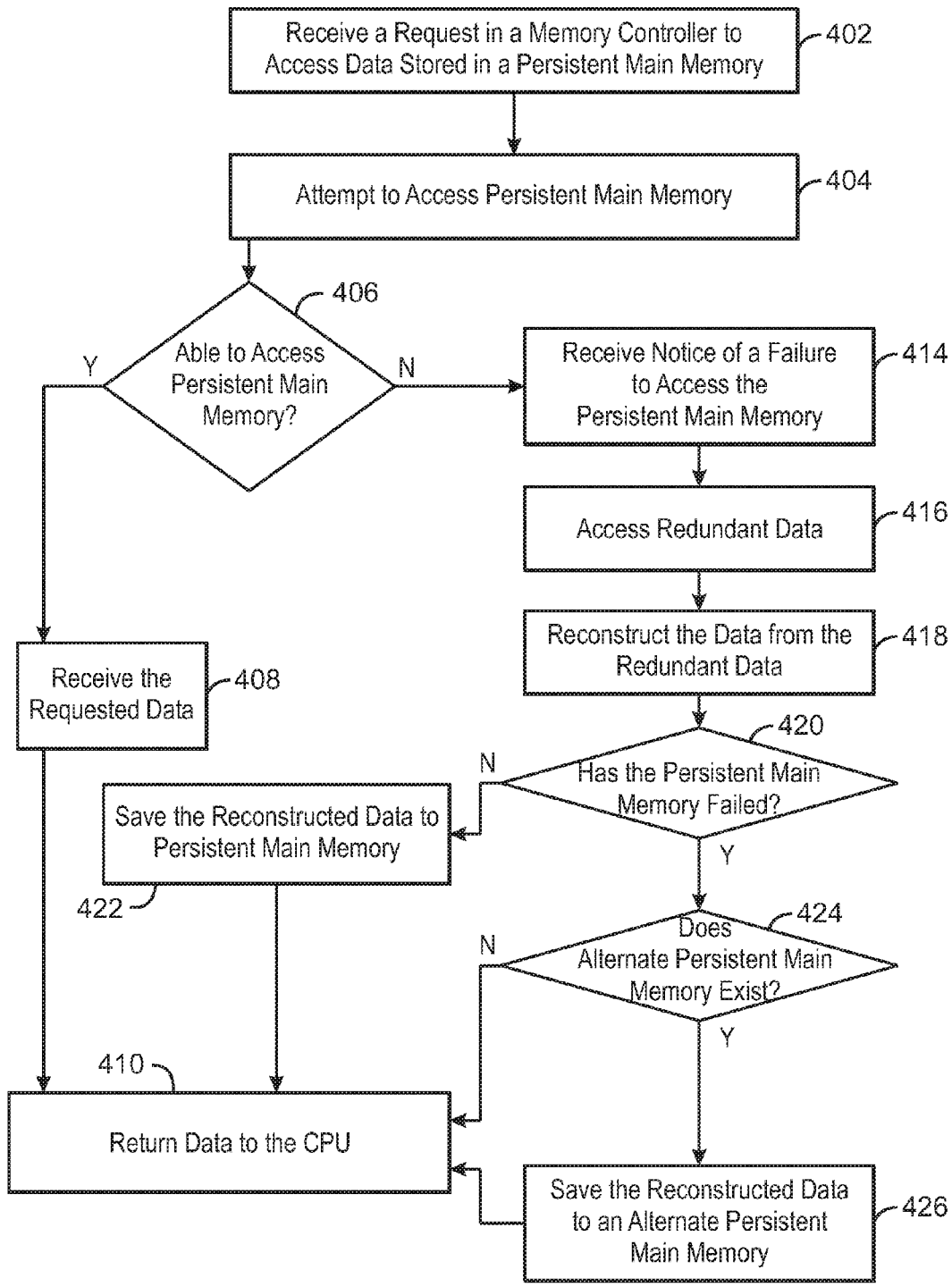
FIG. 4 is a process flow diagram of an example of a method of accessing memory with fault tolerance.

FIG. 4 is a process flow diagram of a method 400 of accessing memory with fault tolerance. At block 402, a request is received in a memory controller to access data stored in a non-volatile, persistent main memory. In an example, the memory controller resides in a computing node, such as computing node 102 or 202. The request originates from a processor, such as CPU 106 or 206.

At block 404, the memory controller attempts to access the non-volatile, persistent main memory. In particular, the memory controller initiates access to the address space of the non-volatile, persistent main memory in which the data resides. At block 406, the memory controller determines if it is able to access the persistent main memory by either receiving the requested data, or receiving an error message or having the access time out. If the memory controller receives the requested data at block 408, then at block 410 the memory controller returns data to the CPU.

If, at block 406, the memory controller is not able to access the persistent main memory, at block 414 notice of a failure to access the persistent main memory is received. In an example, the failure is due to a failed non-volatile, persistent main memory. A non-volatile persistent main memory failure can be due to a damaged memory device, a failed persistent main memory module, corrupted data, or any other failure. At block 416, redundant data is accessed. Redundant data can be stored on remote memory, on other persistent main memories, on additional computing nodes, or on a combination of remote memory, persistent main memories and additional computing nodes. In an example, the redundant data is a mirrored copy of the data produced when the system is in mirroring mode. In another example, the redundant data is a combination of parity data produced when the system is in RAID mode, and other data associated with the parity data. At block 418, the data is reconstructed from the redundant data. In RAID mode, the data can be reconstructed using a data recovery engine.

At block 420, the memory controller determines if the non-volatile, persistent main memory failed. If the memory controller determines that the non-volatile, persistent main memory has not failed, at block 422 the reconstructed data can be saved to the persistent main memory. At block 410, data can be returned to the CPU. If the memory controller determines that the non-volatile, persistent main memory has failed, method 400 can proceed to block 424. At block 424, the memory controller determines if alternate persistent main memory exists. If alternate persistent main memory does not exist, data is returned to the CPU at block 410. If alternate persistent main memory does exist, at block 426 the reconstructed data can be saved to an alternate persistent main memory. In an example, the alternate persistent main memory can be a remote memory. In another example, the alternate persistent main memory can be a persistent main memory of another computing node. At block 410, data is returned to the CPU.

It is to be understood that the process flow diagram of FIG. 4 is not intended to indicate that the steps of the method 400 are to be executed in any particular order, or that all of the steps of the method 400 are to be included in every case. Further, any number of additional steps not shown in FIG. 4 may be included within the method 400, depending on the details of the specific implementation.

Example 1

A computing system is described herein. The computing system includes a processor and a persistent main memory including a fault tolerance capability. The computing system also includes a memory controller. The memory controller is to store data in the persistent main memory, create redundant data, and store the redundant data remotely with respect to the persistent main memory. The memory controller is also to store the redundant data remotely with respect to the persistent main memory. The memory controller is further to access the redundant data during failure of the persistent main memory.

The fault tolerance capability can include storing data to the persistent main memory and mirroring the data to a remote persistent main memory. The fault tolerance capability can also include storing data to the persistent main memory and updating at least one parity remote memory based on a difference between old and new data. The computing system can also include a plurality of computing nodes and a plurality of persistent main memories, each computing node including a processor and a memory controller to communicate with the persistent main memories in response to a request by the processor, wherein the persistent main memories reside remotely to the computing nodes, the persistent main memories including a pool of shared persistent main memory, regions of which are allocated to each computing node.

Example 2

A computing system including fault tolerance is described herein. The computing system includes a persistent main memory for storing data and a remote persistent main memory for storing redundant data. The computing system also includes a memory controller. The memory controller accesses the redundant data when the data in the persistent main memory cannot be accessed.

The redundant data can include a mirrored copy of the data. The computing system can include a plurality of nodes, each node including a persistent main memory for storing data, and a remote persistent memory for storing redundant data, the remote persistent memory acting as a parity node, including a check sum of parity bits of data in the persistent main memories of the nodes of the computing system, wherein the check sum is updated when data is written to the persistent main memory of a node, and wherein upon failure to read the data, the check sum and all other data values contributing to the check sum are read and combined to reconstruct lost data. The computing system can include a plurality of computing nodes and a plurality of persistent main memories, each computing node including a processor and a memory controller to communicate with the persistent main memories in response to a request by the processor. The plurality of persistent main memories can include a first persistent main memory selected by address for storing data, a second persistent main memory selected by address for storing a mirrored copy of the data, wherein data written to the first persistent main memory is also written to the second persistent main memory and wherein upon failure to read the data, the mirrored copy of the data is read. The computing system can include a plurality of computing nodes and a plurality of persistent main memories, each computing node including a processor and a memory controller to communicate with the persistent main memories in response to a request by the processor. The plurality of persistent main memories including a first persistent main memory selected by address for storing data and a second persistent main memory selected by address for storing a check sum associated with the data, wherein the check sum in the second persistent main memory is updated based on a difference between old data and new data stored in the first persistent main memory and wherein upon failure to read the data, the check sum and all other data values contributing to the check sum are read and combined to reconstruct lost data. The persistent main memories can include a pool of shared persistent main memory, regions of which are allocated to each computing node. In event of a failure of an original computing node to which a region of the pool of shared persistent main memory is allocated, a functional computing node accesses the region of the pool of shared persistent main memory so that data in the region of the pool of shared persistent memory is always available.

Example 3

A method is described herein. The method includes receiving, in a memory controller, a request to write data to a persistent main memory of a computing system. The method also includes writing the data to the persistent main memory. The method further includes writing redundant data to a persistent memory remote to the persistent main memory.

The method can further include simultaneously writing the data to the persistent main memory and writing the redundant data to the persistent memory remote to the persistent main memory. Writing redundant data can include updating a check sum of parity bits of data in the computing system, wherein the data in the computing system is stored on persistent main memory of at least two nodes. The method can further include receiving, in a memory controller, a request to access data in the persistent main memory, attempting to access the persistent main memory, receiving notice of a failure of the persistent main memory, reconstructing the data from the redundant data, saving the data, and returning the data to complete the request.

The present examples may be susceptible to various modifications and alternative forms and have been shown only for illustrative purposes. For example, the present techniques support both reading and writing operations to a data structure cache. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:
1. A computing system, comprising:
 a processor;
 a persistent main memory comprising a fault tolerance capability; and
 a memory controller to:
  store data in the persistent main memory;
  create redundant data;
  store the redundant data remotely with respect to the persistent main memory; and
  access the redundant data during failure of the persistent main memory.
2. The computing system of claim 1, wherein the fault tolerance capability comprises storing data to the persistent main memory and mirroring the data to a remote persistent memory.
3. The computing system of claim 1, wherein the fault tolerance capability comprises storing data to the persistent main memory and updating at least one parity remote memory based on a difference between old data and new data.

4. The computing system of claim 1, wherein the computing system comprises a plurality of computing nodes and a plurality of persistent main memories, each computing node comprising:
   a processor; and
   a memory controller to communicate with the persistent main memories in response to a request by the processor,
   wherein the persistent main memories reside remotely to the computing nodes, the persistent main memories comprising a pool of shared persistent main memory, regions of which are allocated to each computing node.

5. The computing system of claim 1, wherein the persistent main memory is accessed as memory, is accessed through direct memory access, and is treated as storage.

6. A computing system comprising fault tolerance, the computing system comprising:
   a persistent main memory for storing data;
   a remote persistent main memory for storing redundant data; and
   a memory controller,
   wherein the memory controller accesses the redundant data when the data in the persistent main memory cannot be accessed.

7. The system of claim 6, wherein the redundant data comprises a mirrored copy of the data.

8. The system of claim 6, wherein the computing system comprises:
   a plurality of nodes, each node comprising a persistent main memory for storing data; and
   a remote persistent memory for storing redundant data, the remote persistent memory acting as a parity node, comprising a check sum of parity bits of data in the persistent main memories of the nodes of the computing system,
   wherein the check sum is updated when data is written to the persistent main memory of a node; and
   wherein upon failure to read the data, the check sum and all other data values contributing to the check sum are read and combined to reconstruct lost data.

9. The system of claim 6, wherein the computing system comprises a plurality of computing nodes and a plurality of persistent main memories, each computing node comprising:
   a processor; and
   a memory controller to communicate with the persistent main memories in response to a request by the processor;
   the plurality of persistent main memories comprising a first persistent main memory selected by address for storing data, a second persistent main memory selected by address for storing a mirrored copy of the data,
   wherein data written to the first persistent main memory is also written to the second persistent main memory; and
   wherein upon failure to read the data, the mirrored copy of the data is read.

10. The system of claim 6, wherein the computing system comprises a plurality of computing nodes and a plurality of persistent main memories, each computing node comprising:
   a processor; and
   a memory controller to communicate with the persistent main memories in response to a request by the processor;
   the plurality of persistent main memories comprising a first persistent main memory selected by address for storing data, a second persistent main memory selected by address for storing a check sum associated with the data;
   wherein the check sum in the second persistent main memory is updated based on a difference between old data and new data stored in the first persistent main memory; and
   wherein upon failure to read the data, the check sum and all other data values contributing to the check sum are read and combined to reconstruct lost data.

11. The system of claim 10, wherein the persistent main memories comprise a pool of shared persistent main memory, regions of which are allocated to each computing node.

12. The system of claim 11, wherein in event of a failure of an original computing node to which a region of the pool of shared persistent main memory is allocated, a functional computing node accesses the region of the pool of shared persistent main memory so that data in the region of the pool of shared persistent memory is always available.

13. A method, comprising:
   receiving, in a memory controller, a request to write data to a persistent main memory of a computing system;
   writing the data to the persistent main memory; and
   writing redundant data to a persistent memory remote to the persistent main memory.

14. The method of claim 13, further comprising simultaneously writing the data to the persistent main memory and writing the redundant data to the persistent memory remote to the persistent main memory.

15. The method of claim 13, writing redundant data comprising updating a check sum of parity bits of data in the computing system, wherein the data in the computing system is stored on persistent main memory of at least two nodes.

16. The method of claim 13, further comprising:
   receiving, in a memory controller, a request to access data in the persistent main memory;
   attempting to access the persistent main memory;
   receiving notice of a failure of the persistent main memory;
   reconstructing the data from the redundant data;
   saving the data; and
   returning the data to complete the request.

17. The method of claim 13, wherein responsive to receiving the request, the memory controller writes the data to the persistent main memory, and wherein the memory controller writes the redundant data by:
   generating a transaction to a plurality of remote persistent memories including the persistent memory remote to the persistent main memory, wherein generation of the transaction causes generation and storage of the redundant data within each remote persistent memory as the memory controller writes the data to the persistent main memory.

18. The method of claim 17, wherein in a mirroring mode, the redundant data is generated as an identical copy of the data written to the persistent main memory, the identical copy written to each remote persistent memory.

19. The method of claim 13, wherein responsive to receiving the request, the memory controller writes the data to the persistent main memory, and wherein the memory controller writes the redundant data to the persistent memory remote to the persistent main memory by:
   sending a command to update the redundant data on the persistent memory remote to the persistent main memory.

20. The method of claim 19, wherein the memory controller, as a redundant array of independent disks (RAID) controller, performs a first exclusive-or (XOR) operation on the data of the request and old data in the persistent main memory, the memory controller sending the command by sending a write delta command including a result of the first XOR operation to the persistent memory remote to the persistent main memory, and wherein the persistent memory remote to the persistent main memory responsively reads the redundant data, performs a second XOR operation on the read redundant data and the result of the first XOR operation, and stores a result of the second XOR operation as the redundant data.

\* \* \* \* \*